(12) United States Patent
Hiyama et al.

(10) Patent No.: US 8,823,849 B2
(45) Date of Patent: Sep. 2, 2014

(54) PHOTOELECTRIC CONVERSION DEVICE AND IMAGE CAPTURING DEVICE HAVING CIRCUIT FOR REDUCING OFFSET GENERATED BY AMPLIFIERS

(75) Inventors: Hiroki Hiyama, Zama (JP); Masanori Ogura, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 310 days.

(21) Appl. No.: 12/859,870

(22) Filed: Aug. 20, 2010

(65) Prior Publication Data

US 2010/0314530 A1 Dec. 16, 2010

Related U.S. Application Data

(63) Continuation of application No. 11/782,978, filed on Jul. 25, 2007, now Pat. No. 7,812,876.

(30) Foreign Application Priority Data

Jul. 26, 2006 (JP) ................................. 2006-203738

(51) Int. Cl.
*H04N 5/335* (2011.01)

(52) U.S. Cl.
USPC ........................................................ 348/308

(58) Field of Classification Search
USPC ................ 348/294, 300, 302, 308; 250/208.1
See application file for complete search history.

(56) References Cited

U.S. PATENT DOCUMENTS

| | | | |
|---|---|---|---|
| 5,892,540 A | 4/1999 | Kozlowski et al. | 348/300 |
| 6,128,039 A | 10/2000 | Chen et al. | 348/294 |
| 6,587,142 B1 | 7/2003 | Kozlowski et al. | 348/241 |
| 6,670,990 B1 | 12/2003 | Kochi et al. | 348/310 |
| 6,781,624 B1 * | 8/2004 | Takahashi | 348/241 |
| 6,960,751 B2 | 11/2005 | Hiyama et al. | 250/208.1 |
| 7,110,030 B1 | 9/2006 | Kochi et al. | 348/308 |
| 7,187,052 B2 | 3/2007 | Okita et al. | 257/444 |
| 7,227,208 B2 | 6/2007 | Ogura et al. | 257/292 |
| 7,573,518 B2 | 8/2009 | Nakamura et al. | 348/302 |
| 2001/0012070 A1 * | 8/2001 | Enod et al. | 348/302 |
| 2003/0164887 A1 | 9/2003 | Koizumi et al. | 348/308 |
| 2003/0190088 A1 * | 10/2003 | Kobayashi | 348/241 |
| 2005/0168602 A1 | 8/2005 | Sumi et al. | 348/294 |
| 2005/0168603 A1 | 8/2005 | Hiyama et al. | 348/294 |
| 2005/0179796 A1 | 8/2005 | Okita et al. | 348/308 |
| 2006/0043393 A1 | 3/2006 | Okita et al. | 257/93 |
| 2006/0043440 A1 | 3/2006 | Hiyama et al. | 257/291 |

(Continued)

FOREIGN PATENT DOCUMENTS

| | | |
|---|---|---|
| JP | 02-107075 A | 4/1990 |
| JP | 6-339082 A | 12/1994 |
| JP | 2003-051989 A | 2/2003 |

*Primary Examiner* — Aung S Moe

(74) *Attorney, Agent, or Firm* — Fitzpatrick, Cella, Harper & Scinto

(57) ABSTRACT

A photoelectric conversion device includes a pixel output line, a pixel which outputs a signal to the pixel output line, an amplifier unit which amplifies the signal output to the pixel output line, and a holding capacitor which holds the signal output from the amplifier unit. The photoelectric conversion device outputs a pixel signal based on the signal held by the holding capacitor. The amplifier unit includes a variable amplifier stage which amplifies a signal output to the pixel output line at a gain selected from a plurality of gains, and a buffer stage which amplifies the signal output from the variable amplifier stage, the amplified signal being held by the holding capacitor to hold the signal.

6 Claims, 9 Drawing Sheets

(56) References Cited

U.S. PATENT DOCUMENTS

| | | | |
|---|---|---|---|
| 2006/0044434 A1 | 3/2006 | Okita et al. | 348/294 |
| 2006/0044439 A1* | 3/2006 | Hiyama et al. | 348/308 |
| 2006/0208161 A1 | 9/2006 | Okita et al. | 250/208.1 |
| 2006/0208291 A1 | 9/2006 | Koizumi et al. | 257/292 |
| 2006/0208292 A1 | 9/2006 | Itano et al. | 257/292 |
| 2006/0221667 A1 | 10/2006 | Ogura et al. | 365/149 |
| 2007/0115377 A1 | 5/2007 | Noda et al. | 348/294 |
| 2007/0126886 A1 | 6/2007 | Sakurai et al. | 348/222.1 |
| 2008/0055445 A1 | 3/2008 | Hatano et al. | 348/302 |
| 2008/0062295 A1 | 3/2008 | Fujimura et al. | 348/301 |
| 2008/0062296 A1 | 3/2008 | Ogura et al. | 348/308 |
| 2008/0218615 A1 | 9/2008 | Huang et al. | 348/294 |
| 2009/0009642 A1 | 1/2009 | Joshi et al. | 348/301 |

* cited by examiner

PHOTOELECTRIC CONVERSION DEVICE AND IMAGE CAPTURING DEVICE HAVING CIRCUIT FOR REDUCING OFFSET GENERATED BY AMPLIFIERS

CROSS REFERENCE TO RELATED APPLICATION

This application is a continuation of U.S. application Ser. No. 11/782,978, filed on Jul. 25, 2007, the entire disclosure of which is hereby incorporated by reference herein.

BACKGROUND OF THE INVENTION

1. Field of the Invention

The present invention relates to a photoelectric conversion device and image capturing device.

2. Description of the Related Art

These days, CMOS sensors have prevailed for digital cameras. One main reason is that the CMOS sensor can achieve a high S/N under ISO sensitivity conditions varying from ISO 100 to ISO 1600. A high-S/N CMOS sensor is effectively implemented using a column amplifier having a gain switching function. This is because random noise can be suppressed much more by switching the gain in a column amplifier of a narrow band (operation frequency of about several hundred kHz) than by applying the gain in a final output amplifier of a wide band (operation frequency of several MHz to several ten MHz). Generally when amplifying an analog signal, increasing the gain at as early a stage as possible is effective against random noise and fixed-pattern noise.

FIGS. 8 and 9 are circuit diagrams excerpted from Japanese Patent Laid-Open No. 6-339082. A photoelectric conversion device disclosed in Japanese Patent Laid-Open No. 6-339082 will be explained with reference to FIGS. 8 and 9. Outputs from BASIS type pixel units $B_1$, $B_2$, $B_3$, and $B_4$ are read out from an emitter signal line, voltage-amplified by column amplifiers A1, A2, A3, and A4, and then written in holding capacitors $G_1$, $G_2$, $G_3$, and $G_4$. Signals written in the holding capacitors $G_1$ to $G_4$ are read out in time series to a horizontal output line 4 in accordance with a control signal from a scanning circuit 1, and output outside via an output amplifier 3. The gains of the column amplifiers A1 to A4 are controlled by a power supply 2. The band of the column amplifiers A1 to A4 may be narrower than that of the output amplifier 3. The column amplifiers A1 to A4 can narrow the frequency band at which noise is integrated, compared to a case where the wide-band output amplifier 3 amplifies a voltage. Thus, the column amplifiers A1 to A4 can reduce random noise. Amplifying a voltage by the column amplifiers A1 to A4 is also effective to suppress fixed-pattern noise. Fixed-pattern noise is generated owing to relative variations between the capacitance values of the holding capacitors $G_1$ to $G_4$, variations between the parasitic capacitances of switches $M_{41}$ to $M_{44}$, and the like. Amplifying a voltage by the output amplifier 3 also amplifies such fixed-pattern noise. Thus, it is more advantageous to amplify a voltage by the column amplifiers A1 to A4.

As the number of pixels of a CMOS sensor increases, the read rate must be increased to obtain the same frame rate. For this purpose, the horizontal blanking period during which a signal is read from a pixel to a holding capacitor must be shortened. However, a solid-state image sensor in which the column amplifier switches the gain suffers the following problem in increasing the read rate.

Generally in an amplifier circuit, as the gain becomes higher, the band of the column amplifier becomes narrower. Gain switching changes the band of the column amplifier. Particularly when a high gain is set, the band narrows, degrading the response characteristic. To improve the response characteristic, the holding capacitor connected to the output of the column amplifier may be decreased to widen the band. However, a small holding capacitor leads to large relative variations between the capacitance values of holding capacitors, increasing fixed-pattern noise. For this reason, the lower limit of the capacitance value of the holding capacitor is defined by fixed-pattern noise, and its upper limit is defined by the response characteristic obtained when high sensitivity is set. However, as the read rate increases, these two requests cannot be satisfied simultaneously.

SUMMARY OF THE INVENTION

The present invention has been made to overcome the conventional drawbacks, and has as its object to increase the read rate while suppressing fixed-pattern noise in an arrangement capable of changing the gain of an amplifier unit which amplifies a signal output from a pixel to a pixel signal line.

The first aspect of the present invention relates to a photoelectric conversion device which comprises a pixel output line, a pixel that outputs a signal to the pixel output line, an amplifier unit that amplifies the signal output to the pixel output line, and a holding capacitor that holds the signal output from the amplifier unit, and which outputs a pixel signal based on the signal held by the holding capacitor. In the photoelectric conversion device, the amplifier unit includes a variable amplifier stage which amplifies a signal output to the pixel output line at a gain selected from a plurality of gains, and a buffer stage which amplifies the signal output from the variable amplifier stage, the amplified signal being held by the holding capacitor.

In a preferred aspect of the present invention, the variable amplifier stage can include a feedback amplifier circuit. The gain of the variable amplifier stage can be changed by changing a feedback coefficient.

In a preferred aspect of the present invention, a plurality of pixels can be two-dimensionally arrayed, and the pixel output line, the amplifier unit, and the holding capacitor can be arranged on each column. The photoelectric conversion device can further comprise a second pixel output line, a switch which controls connection between the holding capacitor on each column and the second pixel output line, and an output amplifier which amplifies a signal output to the second pixel output line.

In a preferred aspect of the present invention, the buffer stage can include a voltage follower.

In a preferred aspect of the present invention, the buffer stage can include a source follower.

The second aspect of the present invention relates to an image capturing device. The image capturing device comprises the photoelectric conversion device, and a processing circuit which processes a signal provided from the photoelectric conversion device.

The present invention can increase the read rate while suppressing fixed-pattern noise in an arrangement capable of changing the gain of an amplifier unit which amplifies a signal output from a pixel to a pixel signal line.

Further features of the present invention will become apparent from the following description of exemplary embodiments with reference to the attached drawings.

DESCRIPTION OF THE EMBODIMENTS

Preferred embodiments of the present invention will be described below with reference to the accompanying drawings.

[First Embodiment]

Figure 1:
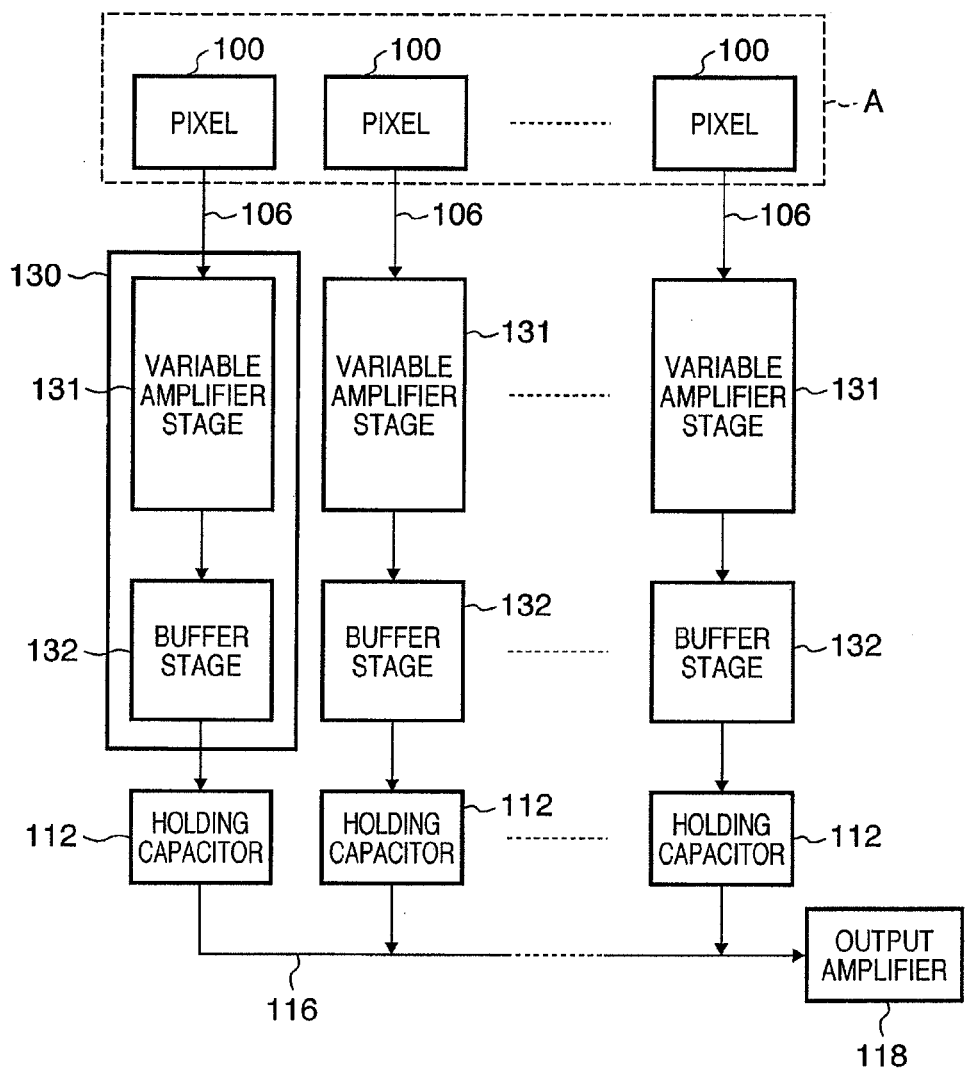
FIG. 1 is a block diagram showing the schematic arrangement of a photoelectric conversion device (solid-state image sensor) according to the first embodiment of the present invention.

FIG. 1 is a block diagram showing the schematic arrangement of a photoelectric conversion device (solid-state image sensor) 10 according to the first embodiment of the present invention. Each pixel 100 includes a photoelectric converter such as a photodiode, and outputs a signal to a vertical output line (first pixel output line) 106 based on a signal obtained by photoelectrically converting incident light. Pixels 100 arrayed in a plurality of rows×a plurality of columns form pixel array A. A vertical scanning circuit (not shown) selects a row while a horizontal scanning circuit (not shown) selects a column. FIG. 1 shows pixels 100 arrayed in one row×a plurality of columns for descriptive convenience.

A column amplifier (amplifier unit) 130 receives a signal output to the vertical output line 106. The column amplifier 130 includes a variable amplifier stage 131, and a buffer stage 132 arranged on the output side of the variable amplifier stage 131. The variable amplifier stage 131 has a structure capable of selectively setting a plurality of voltage amplification factors (gains). The output impedance of the variable amplifier stage 131 is typically high. The buffer stage 132 has sufficiently low output impedance to drive a holding capacitor 112.

The holding capacitor 112 temporarily holds a signal amplified by the column amplifier 130. Signals held by the holding capacitor 112 are sequentially read out to a horizontal output line (second pixel output line) 116 by a horizontal scanning circuit (not shown), differentially amplified by an output amplifier 118, and output outside as pixel signals.

To make the output difference between columns, that is, fixed-pattern noise negligible when a uniform quantity of light enters the pixels 100 of pixel array A, the capacitance values of the holding capacitors 112 require sufficient relative precision. In general, as the capacitance value of the holding capacitor 112 increases, an error caused by variations in line width in the manufacture or the like hardly occurs. However, a larger capacitance value limits the response characteristic of the column amplifier 130 which drives the holding capacitor 112.

The variable amplifier stage 131 in the column amplifier 130 provides a plurality of voltage amplification factors necessary to switch the sensitivity in the photoelectric conversion device 10. This sensitivity is a sensitivity to light incident on the photoelectric conversion device 10, and is generally represented as ISO sensitivity.

As a comparison, assume that the variable amplifier stage 131 drives the holding capacitor 112 having a sufficiently large capacitance value to ensure relative precision. In this arrangement, the band of the variable amplifier stage 131 is limited by the holding capacitor 112, and changes depending on the voltage amplification factor. For example, the variable amplifier stage 131 is formed from a negative feedback amplifier circuit, and the voltage amplification factor is changed by switching the feedback coefficient. In this case, the band becomes narrower as a selected voltage amplification factor (corresponding to the closed loop gain) becomes higher.

To the contrary, in the photoelectric conversion device 10 according to the preferred embodiment of the present invention, the buffer stage 132 drives the holding capacitor 112. Thus, the band is kept uniform regardless of amplification factor (selected amplification factor) set in the variable amplifier stage 131.

The photoelectric conversion device 10 according to the first embodiment can reduce fixed-pattern noise by using a holding capacitor with sufficient relative precision, suppress degradation of the response characteristic of the column amplifier upon selecting a high voltage amplification factor, and increase the read rate.

[Second Embodiment]

Figure 2:
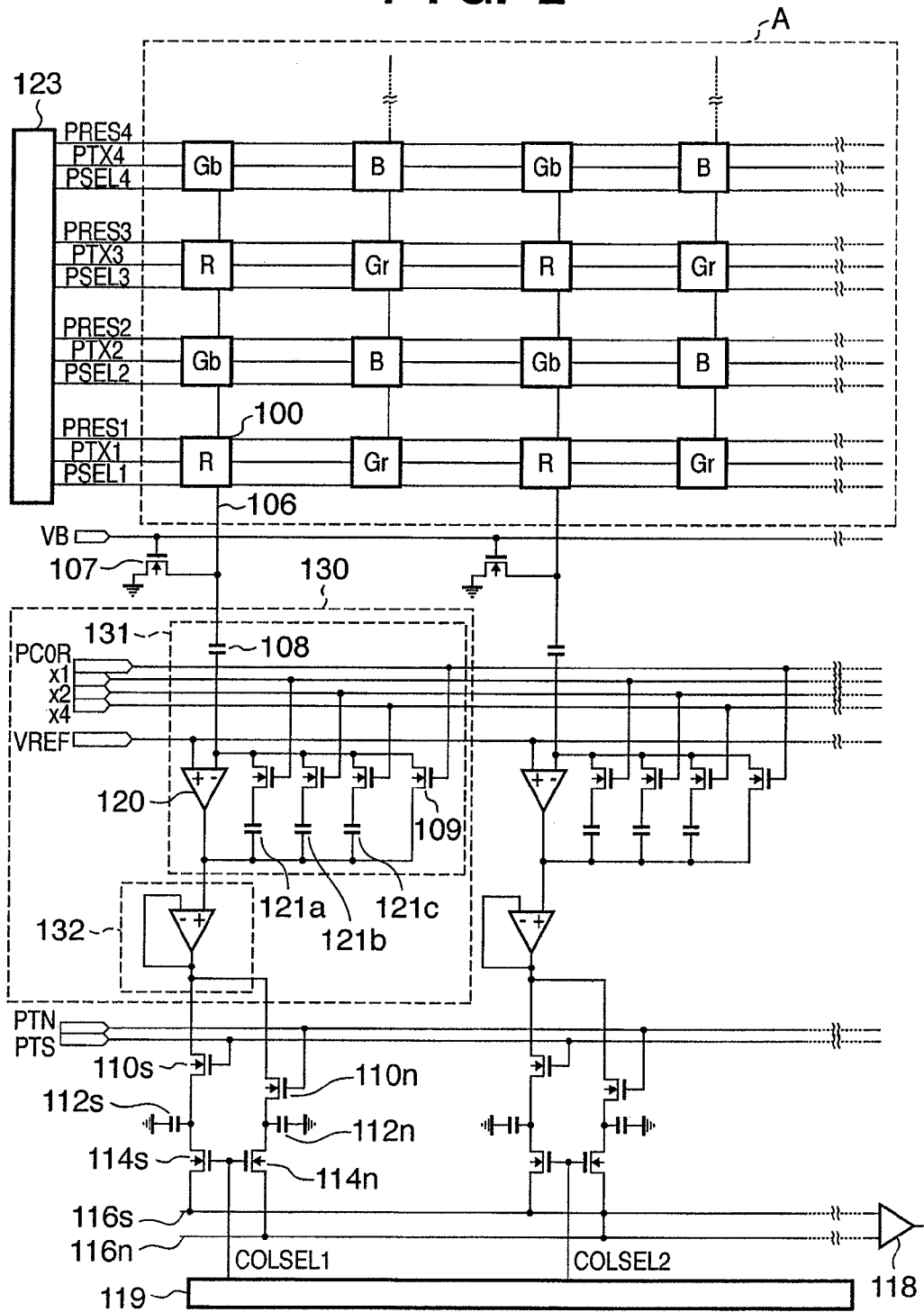
FIG. 2 is a circuit diagram showing the schematic arrangement of a photoelectric conversion device (solid-state image sensor) according to the second embodiment of the present invention.

FIG. 2 is a circuit diagram showing the schematic arrangement of a photoelectric conversion device (solid-state image sensor) 20 according to the second embodiment of the present invention. Pixels 100 arrayed in a plurality of columns×a plurality of rows form pixel array A. Color filters R, Gr, Gb, and B in the Bayer array are formed on the pixels 100. In pixel array A, basic units each of 2×2 pixels are two-dimensionally arrayed.

A pixel having an R color filter will be called an R pixel; a pixel having a Gr color filter, a Gr pixel; a pixel having a Gb color filter, a Gb pixel; and a pixel having a B color filter, a B pixel.

Signals from R and Gb pixels are read out by a readout circuit arranged below pixel array A. Signals from B and Gr pixels are read out by a readout circuit (not shown) arranged above pixel array A.

Figure 3:
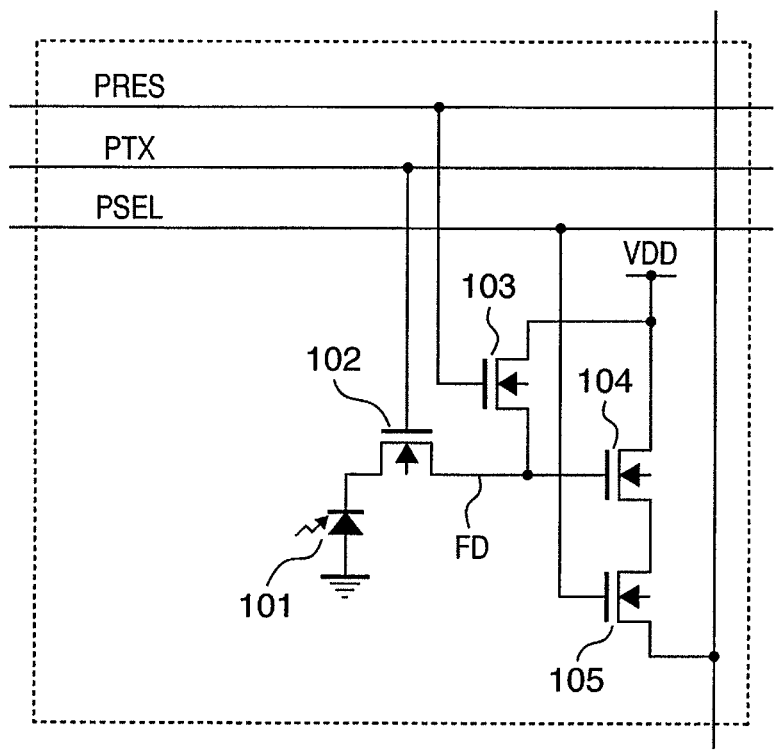
FIG. 3 is an equivalent circuit diagram of one pixel.

FIG. 3 is an equivalent circuit diagram of one pixel 100. The transfer pulse PTX drives a transfer switch 102. The reset pulse PRES drives a reset switch 103. The column selection pulse PSEL drives a column selecting switch 105. PTX is a mark which typifies PTX1 to PTXn (n is a column number). PRES is a mark which typifies PRES1 to PRESn. PSEL is a mark which typifies PSEL1 to PSELn.

Figure 4:
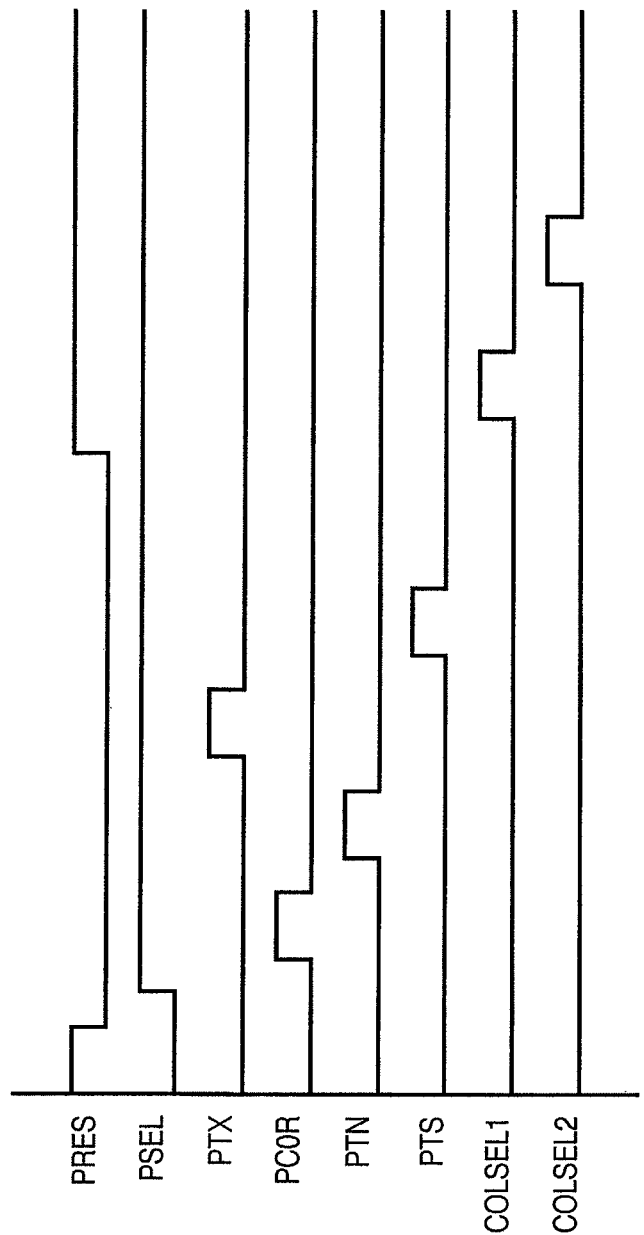
FIG. 4 is a timing chart showing an operation of the photoelectric conversion device shown in FIG. 2.

FIG. 4 is a timing chart showing an operation of the photoelectric conversion device 20 shown in FIG. 2. An operation of the photoelectric conversion device 20 will be explained with reference to FIGS. 2 to 4.

Prior to readout operation, the photoelectric conversion device 20 is exposed for a set exposure time, and a photodiode 101 stores photocharges. In the following description, a row to be driven is selected by PRES1, PTX1, and PSEL1 output from a vertical scanning circuit 123.

First, the pixel reset pulse PRES changes from high level to low level, and reset of the gate electrode of an amplifier MOSFET 104 is canceled. A floating diffusion FD connected to the gate electrode holds a potential corresponding to the dark level.

Then, the column selection pulse PSEL changes to high level, and a dark output corresponding to the potential of the floating diffusion FD appears on a vertical output line 106 by a source follower circuit made up of the amplifier MOSFET 104 and a constant current source 107. In this state, the clamp pulse PC0R is activated to high level to turn on a clamp switch 109. A variable amplifier stage 131 changes to a voltage follower state, and an electrode of a clamp capacitor 108 on the column amplifier side changes to almost voltage VREF.

After that, the clamp pulse PC0R is inactivated from high level to low level, and the output in the dark on the vertical output line 106 is clamped.

Subsequently, the storage pulse PTN is activated to high level, and an amplified signal in the dark (to be referred to as an N output hereinafter) output from a column amplifier 130 is stored in a holding capacitor 112n via a transfer gate 110n. The N output contains the offset of the column amplifier 130.

The transfer pulse PTX is activated to high level, and the transfer switch 102 changes to high level for a predetermined period. Photocharges stored in the photodiode 101 are transferred to the gate electrode of the amplifier MOSFET 104. Transferred charges are electrons. Letting Q be the absolute value of the transferred charge amount, and $C_{FD}$ be the capacitance of the floating diffusion FD, the gate potential drops by $Q/C_{FD}$. In response to this, a light output appears on the vertical output line 106. Letting $G_{sf}$ be the source follower gain, the change $\Delta V_{v1}$ of the potential Vv1 of the vertical output line 106 upon switching from an output in the dark to an output in the light is given by $$\Delta V_{v1} = -Q \cdot G_{sf}/C_{FD} \quad (1)$$

The variable amplifier stage 131 made up of an operational amplifier 120, the clamp capacitor 108, and a feedback capacitor 121 amplifies the change $\Delta V_{v1}$. The output Vct from the variable amplifier stage 131 is given by $$Vct = VREF + Q \cdot (G_{sf}/C_{FD}) \cdot (C_0/C_f) \quad (2)$$

where $C_0$ is the capacitance of the clamp capacitor 108, and $C_f$ is the capacitance value of each of feedback capacitors 121a, 121b, and 121c respectively selected when sensitivity switching pulses x1, x2, and x4 are activated. For example, $C_0$=1 pF. $C_f$=1 pF when the feedback capacitor 121a is selected, $C_f$=0.5 pF when the feedback capacitor 121b is selected, and $C_f$=0.25 pF when the feedback capacitor 121c is selected. Voltage amplification factors represented by $-C_0/C_f$ are $-1\times$, $-2\times$, and $-4\times$. That is, a feedback capacitor to be selected is switched between the feedback capacitors 121a to 121c in the system which negatively feeds back an output to the operational amplifier 120. In response to this, a feedback coefficient determined by the voltage division ratio of $C_f$ and $C_0$ can change to switch the voltage amplification factor.

A negative sign added to the voltage amplification factor represents that the amplifier circuit is an inverting amplifier circuit. The output Vct from the variable amplifier stage 131 that is given by equation (2) is impedance-converted by a buffer stage 132 formed from a voltage follower.

After the transfer pulse is inactivated, the storage pulse PTS is activated to high level. A holding capacitor 112s stores an output in the light (to be referred to as an S output hereinafter) from the column amplifier 130 via a transfer gate 110s.

Subsequently, column selecting switches 114 are sequentially selected by scan pulses COLSEL1, COLSEL2, . . . generated by a horizontal scanning circuit 119. Signals (S and N outputs) from a plurality of columns are sequentially read out to a horizontal output line 116.

Assume that the variable amplifier stage 131 directly drives the holding capacitor 112. In this arrangement, as the voltage amplification factor increases to 1×, 2×, and 4×, the band of the variable amplifier stage 131 becomes narrower, inhibiting an increase in read rate.

To the contrary, in the photoelectric conversion device 20 according to the preferred embodiment of the present invention, the buffer stage 132 formed from a voltage follower drives the holding capacitor 112. Thus, the band is kept uniform regardless of an amplification factor set in the variable amplifier stage 131. Since the holding capacitor 112 having sufficient capacitance to ensure relative precision is usable, fixed-pattern noise can be reduced. When charges are read out from the holding capacitor 112 to horizontal output lines 116s and 116n, the capacitive division ratio can be set high. Letting CT be the capacitance value of each of the holding capacitors 112s and 112n, and CH be the capacitance value of the horizontal output line 116, the capacitive division ratio is given by CT/(CT+CH). This ratio rises as CT becomes larger. Assuming that the signal amplitude required outside is uniform, the gain at another portion of the photoelectric conversion device can be decreased. This leads to a secondary effect capable of decreasing the voltage amplification factor of the column amplifier 130 and that of the output amplifier 118.

Since the buffer stage 132 adopts a voltage follower, an N output written in the holding capacitor 112n can be set to almost VREF without causing any level shift. Hence, the design becomes simple, and the buffer stage 132 can operate at the highest speed.

However, the purpose of the buffer stage 132 is to convert high output impedance from the variable amplifier stage 131 into low output impedance. Thus, the gain of the buffer stage 132 need not be 1×.

Figure 5:
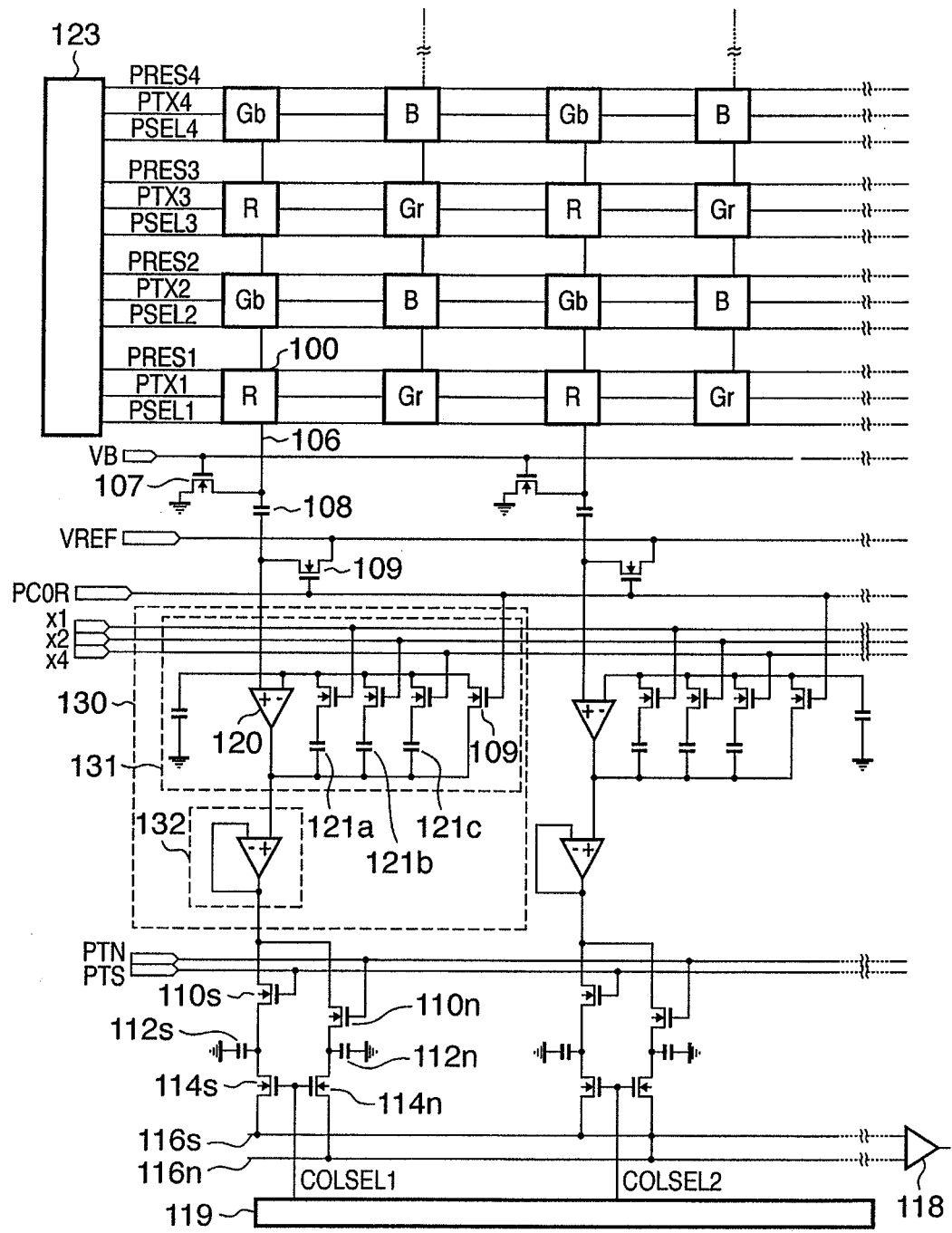
FIG. 5 is a circuit diagram showing a modification of the photoelectric conversion device according to the second embodiment of the present invention.

In the photoelectric conversion device of FIG. 2, the variable amplifier stage 131 is formed from an inverting amplifier circuit. Alternatively, the variable amplifier stage 131 may be formed from a non-inverting amplifier circuit, as shown in FIG. 5.

[Third Embodiment]

Figure 6:
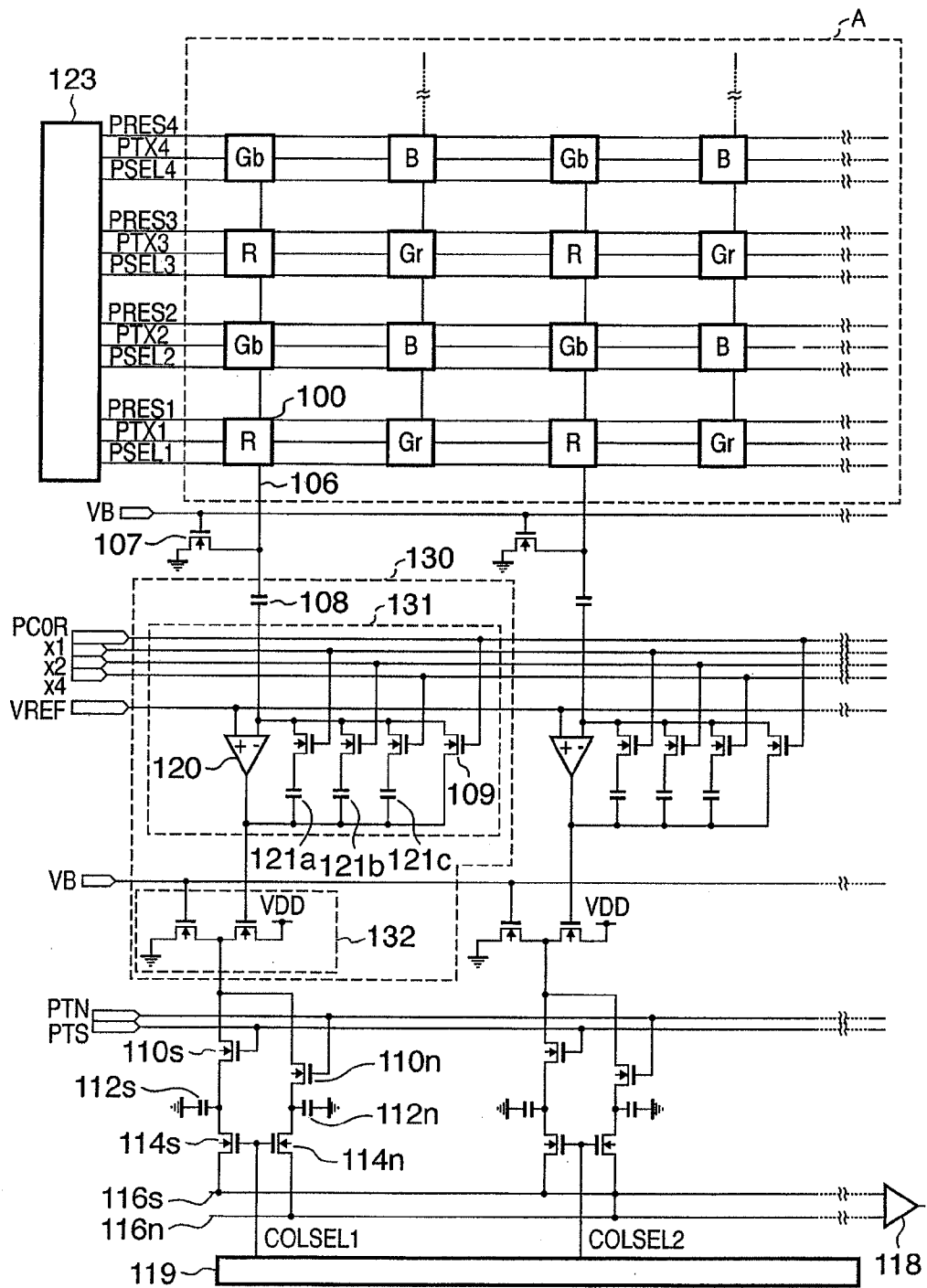
FIG. 6 is a circuit diagram showing the schematic arrangement of a photoelectric conversion device (solid-state image sensor) according to the third embodiment of the present invention.

FIG. 6 is a circuit diagram showing the schematic arrangement of a photoelectric conversion device (solid-state image sensor) 30 according to the third embodiment of the present invention. The photoelectric conversion device 30 according to the third embodiment is different from the photoelectric conversion device 20 according to the second embodiment in that a buffer stage 132 in a column amplifier 130 is formed from a source follower.

As a feature of the photoelectric conversion device 30 according to the third embodiment, the number of elements which form the buffer stage 132 is small. As another feature, when a holding capacitor 112 is charged with a column amplifier output corresponding to the saturation light quantity, it is possible to charge the holding capacitor 112 regardless of the constant current value.

When a signal written in the holding capacitor increases in voltage along with an increase in light quantity, the source follower which forms the buffer stage 132 is preferably an NMOS source follower. To the contrary, when the signal decreases in voltage along with an increase in light quantity, the source follower is preferably a PMOS source follower.

From this, the third embodiment can implement a high-speed column amplifier which occupies a small area.

[Application Example]

Figure 7:
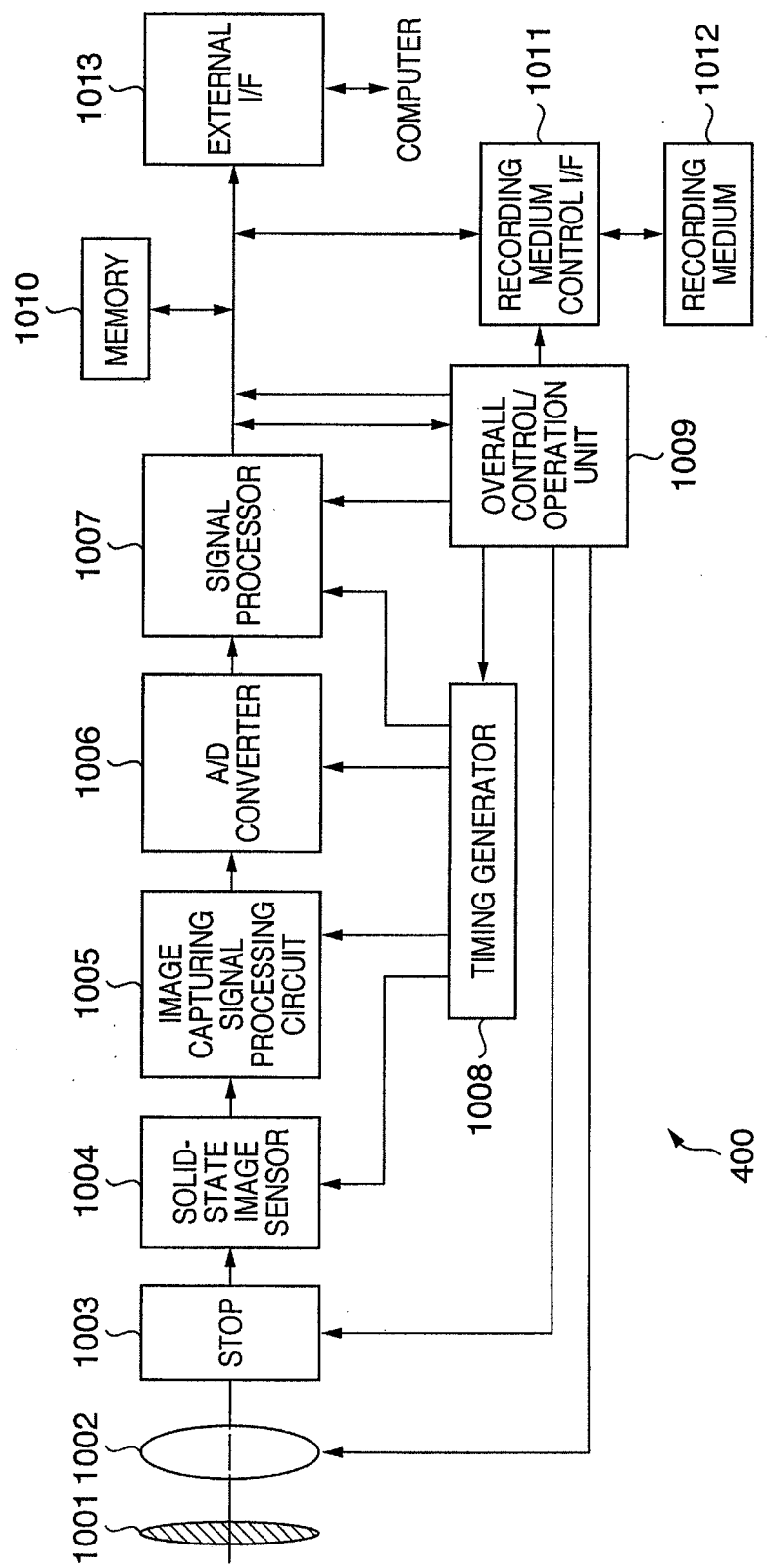
FIG. 7 is a block diagram showing the schematic arrangement of an image capturing device according to a preferred embodiment of the present invention.
Figure 8:
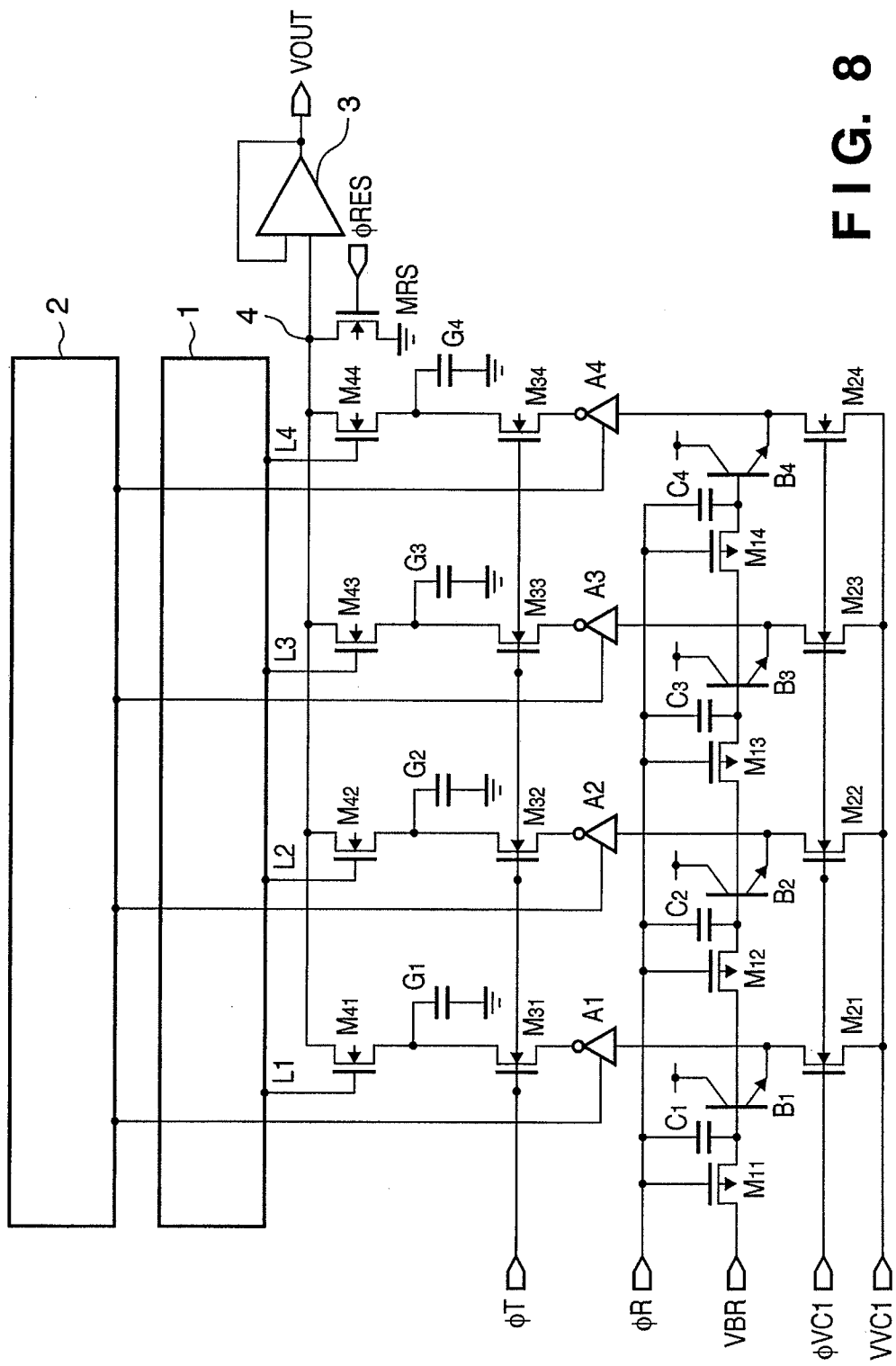
FIG. 8 is a circuit diagram showing the arrangement of a conventional solid-state image sensor.
Figure 9:
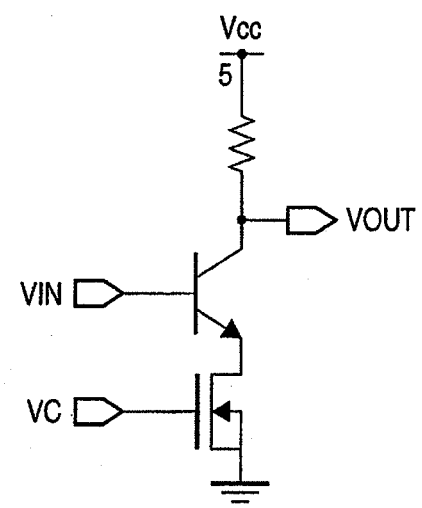
FIG. 9 is a circuit diagram showing the arrangement of the column amplifier of the conventional solid-state image sensor.

FIG. 7 is a block diagram showing the schematic arrangement of an image capturing device according to a preferred embodiment of the present invention. An image capturing device 400 comprises a solid-state image sensor 1004 typified by each of the photoelectric conversion devices 10, 20, and 30 according to the first, second, and third embodiments.

A lens 1002 forms an optical image of an object on the image capturing plane of the solid-state image sensor 1004. The outer surface of the lens 1002 is covered with a barrier 1001 which protects the lens 1002 and also serves as a main switch. The lens 1002 has a stop 1003 to adjust the quantity of light passing through the lens 1002. An image capturing signal processing circuit 1005 performs various processes such as correction and clamping for image capturing signals output from the solid-state image sensor 1004 through a plurality of channels. An A/D converter 1006 analog-to-digital-converts image capturing signals output from the image capturing signal processing circuit 1005 through a plurality of channels. A signal processor 1007 performs various processes such as correction and data compression for image data output from the A/D converter 1006. The solid-state image sensor 1004, image capturing signal processing circuit 1005, A/D converter 1006, and signal processor 1007 operate in accordance with timing signals generated by a timing generator 1008.

The blocks 1005 to 1008 may be formed on the same chip as that of the solid-state image sensor 1004. An overall control/operation unit 1009 controls the blocks of the image capturing device 400. The image capturing device 400 comprises a memory 1010 for temporarily storing image data, and a recording medium control interface 1011 for recording/reading out an image on/from a recording medium. A recording medium 1012 includes a semiconductor memory and the like and is detachable. The image capturing device 400 may comprise an external interface (I/F) 1013 for communicating with an external computer or the like.

The operation of the image capturing device 400 shown in FIG. 7 will be described. In response to opening of the barrier 1001, the main power supply, the power supply of the control system, and the power supply of the image capturing circuit including the A/D converter 1006 are sequentially turned on. To control the exposure, the overall control/operation unit 1009 sets the stop 1003 to the full-aperture state. A signal output from the solid-state image sensor 1004 enters the A/D converter 1006 through the image capturing signal processing circuit 1005. The A/D converter 1006 A/D-converts the signal and outputs it to the signal processor 1007. The signal processor 1007 processes the data and supplies it to the overall control/operation unit 1009. The overall control/operation unit 1009 calculates and determines the exposure. The overall control/operation unit 1009 controls the stop based on the determined exposure.

The overall control/operation unit 1009 extracts a high-frequency component from the signal which is output from the solid-state image sensor 1004 and processed by the signal processor 1007, and calculates the distance to the object based on the high-frequency component. The overall control/operation unit 1009 drives the lens 1002 to determine whether the object is in focus. If the overall control/operation unit 1009 determines that the object is out of focus, it drives the lens 1002 again to measure the distance.

After confirming that the object is in focus, actual exposure starts. After the end of exposure, an image capturing signal output from the solid-state image sensor 1004 undergoes correction and the like by the image capturing signal processing circuit 1005, is A/D-converted by the A/D converter 1006, and is processed by the signal processor 1007. The image data processed by the signal processor 1007 is stored in the memory 1010 by the overall control/operation unit 1009.

The image data stored in the memory 1010 is recorded on the recording medium 1012 via the recording medium control I/F under the control of the overall control/operation unit 1009. The image data can be provided to a computer or the like via the external I/F 1013 and processed by it.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-203738, filed Jul. 26, 2006, which is hereby incorporated by reference herein in its entirety.

What is claimed is:

1. A photoelectric conversion device comprising:
a plurality of pixels arranged to form a pixel array having a plurality of rows and a plurality of columns;
a plurality of amplifier units each provided to a corresponding column of the plurality of columns, wherein each of the plurality of amplifier units includes a variable amplifier stage and a voltage follower, the variable amplifier stage being configured to amplify a signal outputted from a pixel of a corresponding column with a gain selected from a plurality of selectable gains, the voltage follower including a differential amplifier having a first input terminal receiving a signal outputted from the variable amplifier stage, a second input terminal, and an output terminal that is permanently connected to the second input terminal; and
a circuit configured to reduce an offset generated in the plurality of amplifier units, wherein the circuit includes a plurality of capacitances, each of the plurality of capacitances being configured to hold a signal that is outputted from the output terminal of the voltage follower of a corresponding amplifier unit of the plurality of amplifier units.

2. The device according to claim 1, wherein, in each of the amplifier units, the variable amplifier stage includes a feedback amplifier circuit, and a gain of the variable amplifier stage is changed by changing a feedback coefficient of the feedback amplifier circuit.

3. The device according to claim 2, wherein, in each of the amplifier units, the feedback amplifier circuit includes a differential amplifier, a clamp capacitor arranged between pixels of a corresponding column of the plurality of columns and the differential amplifier of the feedback amplifier circuit, a plurality of feedback capacitors, and a switch configured to connect an input terminal of the differential amplifier of the feedback amplifier circuit and an output terminal of the differential amplifier of the feedback amplifier circuit.

4. The device according to claim 3, wherein each of the plurality of capacitances is configured to hold a signal that is outputted from the voltage follower of a corresponding amplifier unit of the plurality of amplifier units during a period in which the switch is turned off.

5. The photoelectric conversion device according to claim 1, wherein the photoelectric conversion device is incorporated in an image capturing device that includes a processing circuit configured to process a signal provided from the photoelectric conversion device.

6. A photoelectric conversion device comprising:
a plurality of pixels arranged to form a pixel array having a plurality of rows and a plurality of columns;
a plurality of amplifier units each provided to a corresponding column of the plurality of columns, wherein each of the plurality of amplifier units includes a variable amplifier stage and a voltage follower, the variable amplifier stage being configured to amplify a signal outputted from a pixel of a corresponding column with a gain selected from a plurality of selectable gains, the voltage follower including a differential amplifier having a first input terminal receiving a signal outputted from the variable amplifier stage, a second input terminal, and an output terminal that is permanently connected to the second input terminal; and a circuit configured to reduce an offset generated in the plurality of amplifier units.

\* \* \* \* \*